(12) United States Patent
Sakakibara

(10) Patent No.: US 8,458,771 B2
(45) Date of Patent: Jun. 4, 2013

(54) IMAGE FORMING APPARATUS, AUTHENTICATION METHOD, AND RECORDING MEDIUM

(75) Inventor: Akiyoshi Sakakibara, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 20 days.

(21) Appl. No.: 13/067,892

(22) Filed: Jul. 5, 2011

(65) Prior Publication Data

US 2011/0271323 A1 Nov. 3, 2011

Related U.S. Application Data

(62) Division of application No. 11/826,736, filed on Jul. 18, 2007, now Pat. No. 8,006,083.

(30) Foreign Application Priority Data

Jul. 28, 2006 (JP) ................................ 2006-206522

(51) Int. Cl.
*G06F 7/04* (2006.01)
(52) U.S. Cl.
USPC ....................................... 726/3; 726/5; 726/2
(58) Field of Classification Search
None
See application file for complete search history.

(56) References Cited

U.S. PATENT DOCUMENTS

| | | | |
|---|---|---|---|
| 6,367,009 B1* | 4/2002 | Davis et al. .................. | 713/166 |
| 7,242,277 B2* | 7/2007 | Minemura .................... | 340/5.53 |
| 7,437,752 B2* | 10/2008 | Heard et al. .................. | 726/1 |
| 7,603,698 B2* | 10/2009 | Konno .......................... | 726/2 |
| 2003/0236977 A1* | 12/2003 | Levas et al. ................... | 713/158 |
| 2005/0055547 A1 | 3/2005 | Kawamura | |
| 2005/0198494 A1 | 9/2005 | Ishibashi | |
| 2006/0107039 A1 | 5/2006 | Sugiura et al. | |

(Continued)

FOREIGN PATENT DOCUMENTS

| | | |
|---|---|---|
| JP | 11-355266 | 12/1999 |
| JP | 2000-339273 | 2/2000 |

(Continued)

OTHER PUBLICATIONS

Authorization Glossary; GFD-I.042 Markus Lorch, Virginia Tech Category: Informational; Mary Thompson, Lawrence Berkeley Nat'l Laboratory Authorization Frameworks and Mechanisms—WG Jan. 23, 2004 revised Nov. 19, 2004; Copyright © Global Grid Forum (2004); year 2004.*
Notice of Rejection for Japanese patent application No. 2006-206522 dated Feb. 15, 2011.
Ricoh Delivers Printer Control Tool Share by Patrick Hoffman, Jun. 16, 2007.

(Continued)

*Primary Examiner* — David Y Jung
(74) *Attorney, Agent, or Firm* — Harness, Dickey & Pierce, P.L.C.

(57) ABSTRACT

An image forming apparatus is configured to receive user authentication information and perform image formation based on an image formation request and is connected to an external authentication server which performs authentication based on the user authentication information. The image forming apparatus comprises an authentication querying unit that queries the external authentication server for the authentication based on the user authentication information; an authentication result receiving unit that receives a result of the authentication performed by the external authentication server; an authentication result storage unit that stores the result of the authentication received by the authentication result receiving unit; and a control unit that controls the authentication querying unit, the authentication result receiving unit, and the authentication result storage unit. When the image forming apparatus receives the user authentication information, the control unit performs the authentication based on the result of the authentication stored in the authentication result storage unit.

14 Claims, 8 Drawing Sheets

U.S. PATENT DOCUMENTS

| | | | |
|---|---|---|---|
| 2006/0200425 A1* | 9/2006 | Steele et al. | 705/64 |
| 2006/0265340 A1* | 11/2006 | Ziv et al. | 705/76 |
| 2007/0094710 A1* | 4/2007 | Walker et al. | 726/2 |
| 2010/0211945 A1* | 8/2010 | Doui | 717/176 |
| 2012/0221676 A1* | 8/2012 | Parker | 709/217 |
| 2012/0240211 A1* | 9/2012 | Counterman | 726/9 |
| 2012/0331527 A1* | 12/2012 | Walters et al. | 726/4 |
| 2013/0019281 A1* | 1/2013 | Jacobs | 726/4 |

FOREIGN PATENT DOCUMENTS

| | | |
|---|---|---|
| JP | 2003-054084 | 2/2003 |
| JP | 2005-036394 | 2/2005 |
| JP | 2005-085090 | 3/2005 |
| JP | 2005-202923 | 7/2005 |
| JP | 2006-146508 | 6/2006 |

OTHER PUBLICATIONS

Modeling and Control of a Hybrid Two-Component Development Process for Xerography; Liu, F.; Chiu, GT.-C.; Hamby, E.S.; Eun, Y.; Control Systems Technology, IEEE Transactions on; vol. PP, Issue: 99; Publication Year: 2010, pp. 1-14.

Printer-scanner identification via analysis of structured security deterrents; Gaubatz, M.D.; Simske, S.J.; Information Forensics and Security, 2009. WIFS 2009. First IEEE International Workshop on; Publication Year: 2009, pp. 151-155.

Digital camera connectivity solutions using the picture transfer protocol (PTP); Bigioi, P.; Susanu, G.; Corcoran, P.; Mocanu, I.; Consumer Electronics, IEEE Transactions on; vol. 48, Issue 3, Publication Year: 2002, pp. 417-427.

* cited by examiner

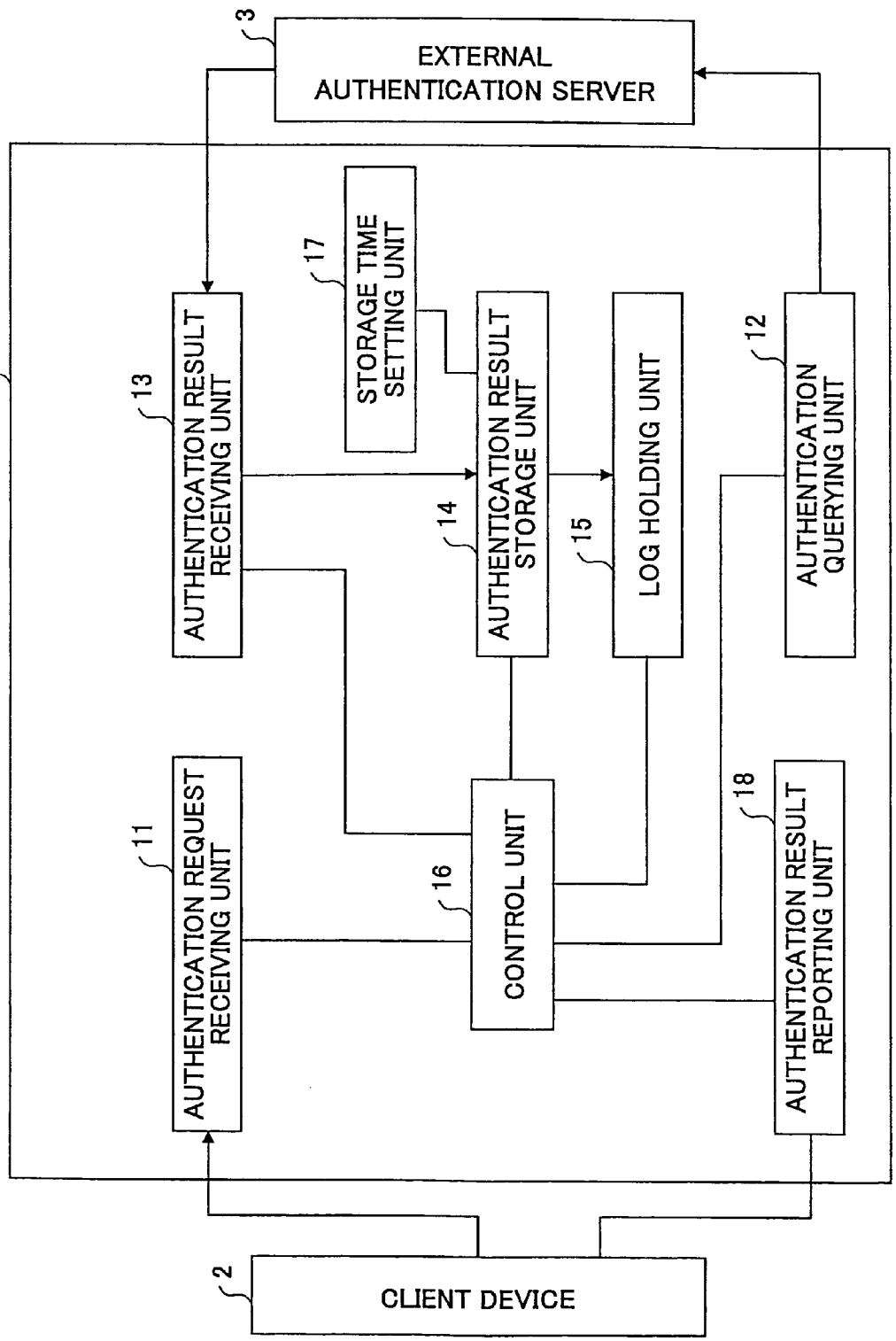

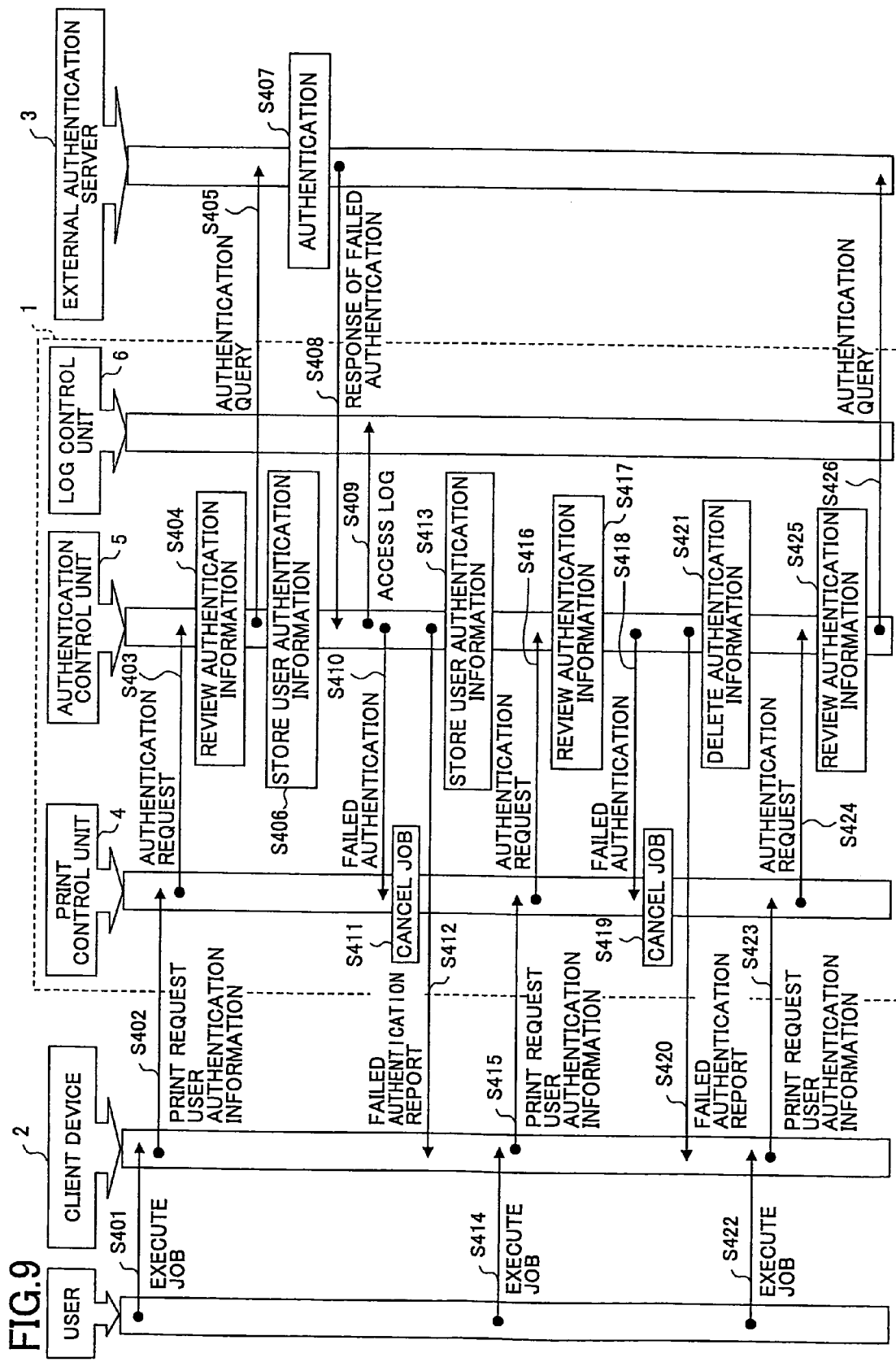

IMAGE FORMING APPARATUS, AUTHENTICATION METHOD, AND RECORDING MEDIUM

CROSS-REFERENCE TO RELATED APPLICATIONS

This application is a divisional of U.S. patent application Ser. No. 11/826,736 filed on Jul. 18, 2007 non U.S. Pat. No. 8,006,083 which claims the benefit of Japanese patent application no. 2006-206522, filed on Jul. 28, 2006. The disclosure(s) of the above application(s) is (are) incorporated herein by reference.

BACKGROUND OF THE INVENTION

1. Field of the Invention

The present invention relates to an image forming apparatus, an authentication method, and a recording medium having an authentication program embodied therein.

2. Description of the Related Art

Recent image forming apparatuses including printers can perform printing operations based on print requests received from plural personal computers (PCs) connected through a network such as a LAN. To specify PCs that can cause an image forming apparatus to perform printing operations, the print requests sent from the PCs often have attached user authentication information containing information about PC users.

When an image forming apparatus receives a print request and user authentication information from a PC, the image forming apparatus performs authentication based on the user authentication information. If authentication succeeds, the image forming apparatus performs a printing operation based on the print request. On the other hand, if authentication fails, the print request is cancelled, so that no printing operation is performed. In this way, it is possible to specify PCs that can cause an image forming apparatus to perform printing operations.

In company offices, for example, an external authentication server holds such user authentication information. If an image forming apparatus receives a print request and user authentication information, the image forming apparatus queries the external authentication server for authentication based on the received user authentication information. In response to the query, the external authentication server performs authentication and sends the authentication result to the image forming apparatus. The image forming apparatus controls image forming operations based on the received authentication result.

Various inventions have been devised to effectively perform such authentication operations.

Patent Document 1 discloses a technique of permitting use of plural services by a single entry of user authentication information. This technique is for holding user authentication information entered upon use of a service and thereby omitting an authentication operation upon use of another service.
<Patent Document 1> Japanese Patent Laid-Open Publication No. 2005-202923

According to the invention disclosed in Patent Document 1, every time authentication using user authentication information stored in a client device is needed for permitting use of a service, an authentication apparatus such as an external authentication server is requested to perform authentication. Thus, a large workload is placed on the external authentication server.

Take another example in which a user instructs a printer to print ten copies of a document from a PC with Windows OS (trademark) running an application Excel (trademark); since Excel (trademark) creates a separate job for each copy, the PC sends ten sets of a print request and user authentication information to the printer. The printer queries an external authentication server for authentication based on each of the received ten sets of user authentication information. This might lock up (overload) the external authentication server.

SUMMARY OF THE INVENTION

The present invention solves one or more of the above described problems. The present invention is directed to providing an image forming apparatus, an authentication control method, and a recording medium storing an authentication control method that prevent an external authentication server from being locked up.

According to an aspect of the present invention, there is provided an image forming apparatus that is configured to receive user authentication information and perform image formation based on an image formation request and is connected to an external authentication server which performs authentication based on the user authentication information. The image forming apparatus comprises an authentication querying unit that queries the external authentication server for the authentication based on the user authentication information; an authentication result receiving unit that receives a result of the authentication performed by the external authentication server; an authentication result storage unit that stores the result of the authentication received by the authentication result receiving unit; and a control unit that controls the authentication querying unit, the authentication result receiving unit, and the authentication result storage unit. When the image forming apparatus receives the user authentication information, the control unit performs the authentication based on the result of the authentication stored in the authentication result storage unit.

According to another aspect of the present invention, there is provided an authentication method executable by an image forming apparatus that is configured to receive user authentication information and perform image formation based on an image formation request, and is connected to an external authentication server which performs authentication based on the user authentication information. The authentication method comprises an authentication querying step of querying the external authentication server for the authentication based on the user authentication information; an authentication result receiving step of receiving a result of the authentication performed by the external authentication server; an authentication result storing step of storing the result of the authentication received in the authentication result receiving step; and a controlling step of controlling the authentication querying step, the authentication result receiving step, and the authentication result storing step. When the image forming apparatus receives the user authentication information, the authentication is performed in the controlling step based on the result of the authentication stored in the authentication result storing step.

According to still another aspect of the present invention, there is provided a recording medium storing an authentication program executable by an image forming apparatus that is configured to receive user authentication information and perform image formation based on an image formation request and is connected to an external authentication server which performs authentication based on the user authentication information. The authentication program causes the image forming apparatus to perform an authentication querying function of querying the external authentication server for the authentication based on the user authentication information; an authentication result receiving function of receiving a result of the authentication performed by the external authentication server; an authentication result storing function of storing the result of the authentication received by the authentication result receiving function; and a controlling function of performing, when the image forming apparatus receives the user authentication information, authentication based on the result of the authentication stored in the authentication result storing function.

Embodiments of the present invention provide an image forming apparatus, an authentication control method, and a recording medium storing an authentication control program therein that prevent an external authentication server from being locked up.

BRIEF DESCRIPTION OF THE DRAWINGS

FIG. 8 is a functional block diagram showing an image forming apparatus according to Embodiment 2; and FIG. 9 is an operation sequence diagram illustrating an example of authentication control method according to Embodiment 2.

DETAILED DESCRIPTION OF THE PREFERRED EMBODIMENT

The following describes preferred embodiments of the present invention with reference to the accompanying drawings. Although a printer 1 is taken as an example of an image forming apparatus in the following embodiments, other devices may be used as an image forming apparatus.
(Overview of Image Forming Apparatus)

Figure 1:
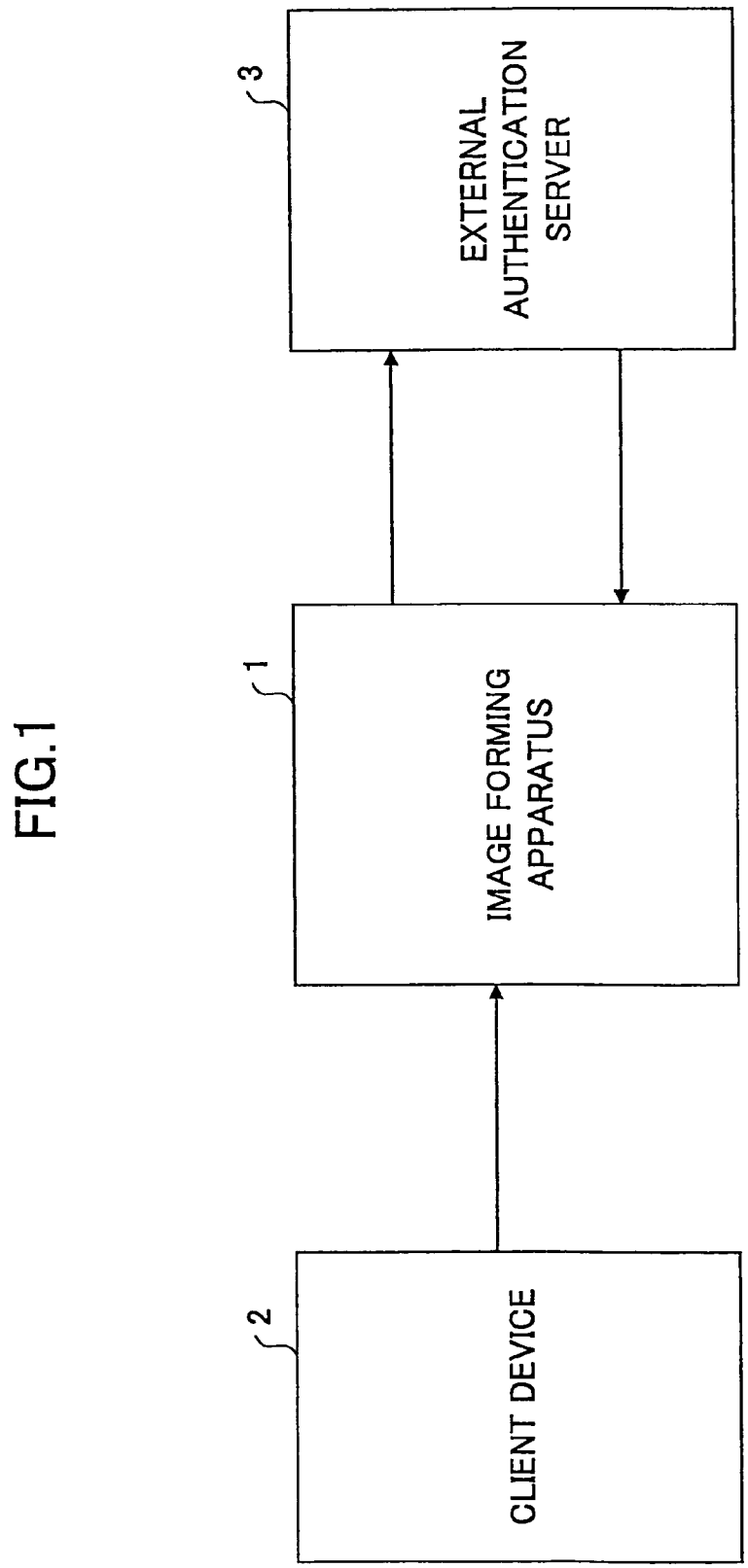
FIG. 1 is a diagram illustrating an overview of an image forming apparatus according to an embodiment of the present invention.

First, an overview of the printer 1 as an example of an image forming apparatus is described according to an embodiment of the present invention with reference to FIG. 1. FIG. 1 is a diagram illustrating an overview of an image forming apparatus according to an embodiment of the present invention.

With reference to FIG. 1, a printer 1 as an embodiment of the present invention is connected to a client device 2 and an external authentication server 3 through a network such as a LAN.

The printer 1 is configured to perform printing operations. For example, the printer 1 receives a print request as an image formation request and user authentication information from the client device 2 (described below) such as a personal computer (PC). Then, an authentication control unit 5 (described below) of the printer 1 performs authentication based on the received user authentication information through communications with the external authentication server 3 (described below). If authentication succeeds, an image forming unit (not shown) of the printer 1 performs a printing operation based on the print request. It is to be noted that the user authentication information includes a user ID and a password.

The client device 2 may be a PC or the like, which sends a print request and user authentication information to the printer 1.

The external authentication server 3 is configured to perform authentication in response to a query for authentication based on user authentication information. For instance, the external authentication server 3 receives a query for authentication from the printer 1, and sends the printer 1 a response of successful authentication indicating that authentication has succeeded or a response of failed authentication indicating that authentication has failed as an authentication result.

With this configuration, the printer 1 receives a print request and user authentication information from the client device 2. Then, the printer 1 performs authentication through communications with the external authentication server 3 based on the received user authentication information. If authentication succeeds, the printer 1 performs a printing operation.
(Configuration of Image Forming Apparatus)

Figure 2:
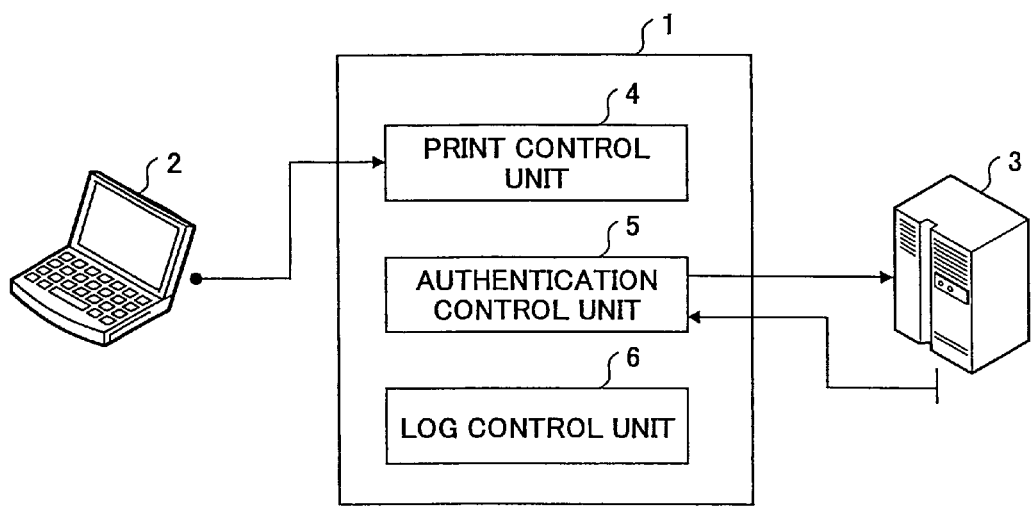
FIG. 2 is a diagram showing a printer as an example of an image forming apparatus according to an embodiment of the present invention.
Figure 3:
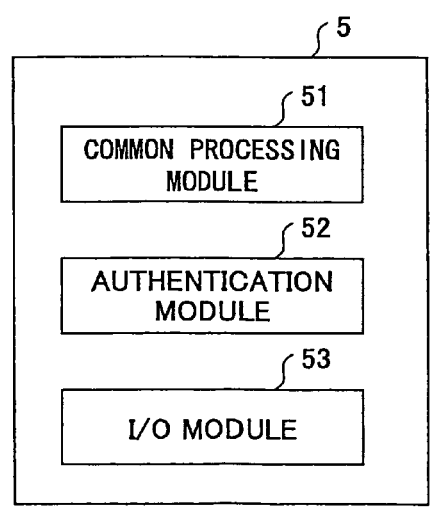
FIG. 3 is a block diagram showing a software configuration example of an authentication control unit of an image forming apparatus according to an embodiment of the present invention.

Next, a configuration of the printer 1 is described with reference to FIGS. 2 and 3. FIG. 2 is a drawing showing a configuration of the printer 1 according to an embodiment of the present invention. FIG. 3 is a drawing showing a software configuration of the authentication control unit 5 of the printer 1 according to an embodiment of the present invention.

Referring to FIG. 2, the printer 1 includes a print control unit 4, the authentication control unit 5, and a log control unit 6.

The print control unit 4 controls printing operations. For example, the print control unit 4 receives a print request and user authentication information from the client device 2. Based on the received user authentication information, the print control unit 4 sends an authentication request to the authentication control unit 5 (described below). If the print control unit 4 receives an authentication result indicating that authentication has succeeded ("authentication successful"), a printing operation, is performed based on the print request. Print control operations are performed by an application.

The authentication control unit 5 controls authentication operations. For example, the authentication control unit 5 receives an authentication request from the print control unit 4, controls an authentication operation based on the received authentication request, and sends an authentication result to the print control unit 4. Authentication control operations are performed by, e.g., a CCS (Certification Control Service). An authentication control method performed here is described below in greater detail with reference to an example of an authentication control method.

The log control unit 6 controls and manages log information. For example, the log control unit 6 receives access logs from the authentication control unit 5 and controls and manages the received access logs. Log control and management operations are performed by, e.g., a LCS (Log Control Service).

In the printer 1 with this configuration, the print control unit 4 first receives a print request and user authentication information from the client device 2, and sends the authentication control unit 5 an authentication request associated with the user authentication information. The authentication control unit 5 performs authentication using an authentication control method, which is described below with reference to an example of an authentication control method. The authentication control unit 5 then sends the authentication result to the print control unit 4. If the authentication result is "authentication successful", the print control unit 4 performs a printing operation based on the print request.

(Software Configuration of Authentication Control Unit of Image Forming Apparatus)

In the following, an exemplary software configuration of the authentication control unit 5 of the printer 1 is described according to an embodiment of the present invention with reference to FIG. 3.

With reference to FIG. 3, the authentication control unit 5 includes a common processing module 51, an authentication module 52, and an I/O module 53.

The common processing module 51 is an interface with the print control unit 4 and configured to perform authentication management, screen control, etc.

The authentication module 52 is configured to perform authentication management, screen control, etc., according to an authentication method. The authentication method is described below in greater detail with reference to an example of an authentication control method.

The I/O module 53 is configured to communicate with authentication devices such as the external authentication server 3.

With this configuration, in response to an authentication request received from the print control unit 4, the authentication control unit 5 of the printer 1 performs authentication through communications with the external authentication server 3 by using software components including the common processing module 51, the authentication module 52, and the I/O module 53.

Embodiment 1

Figure 4:
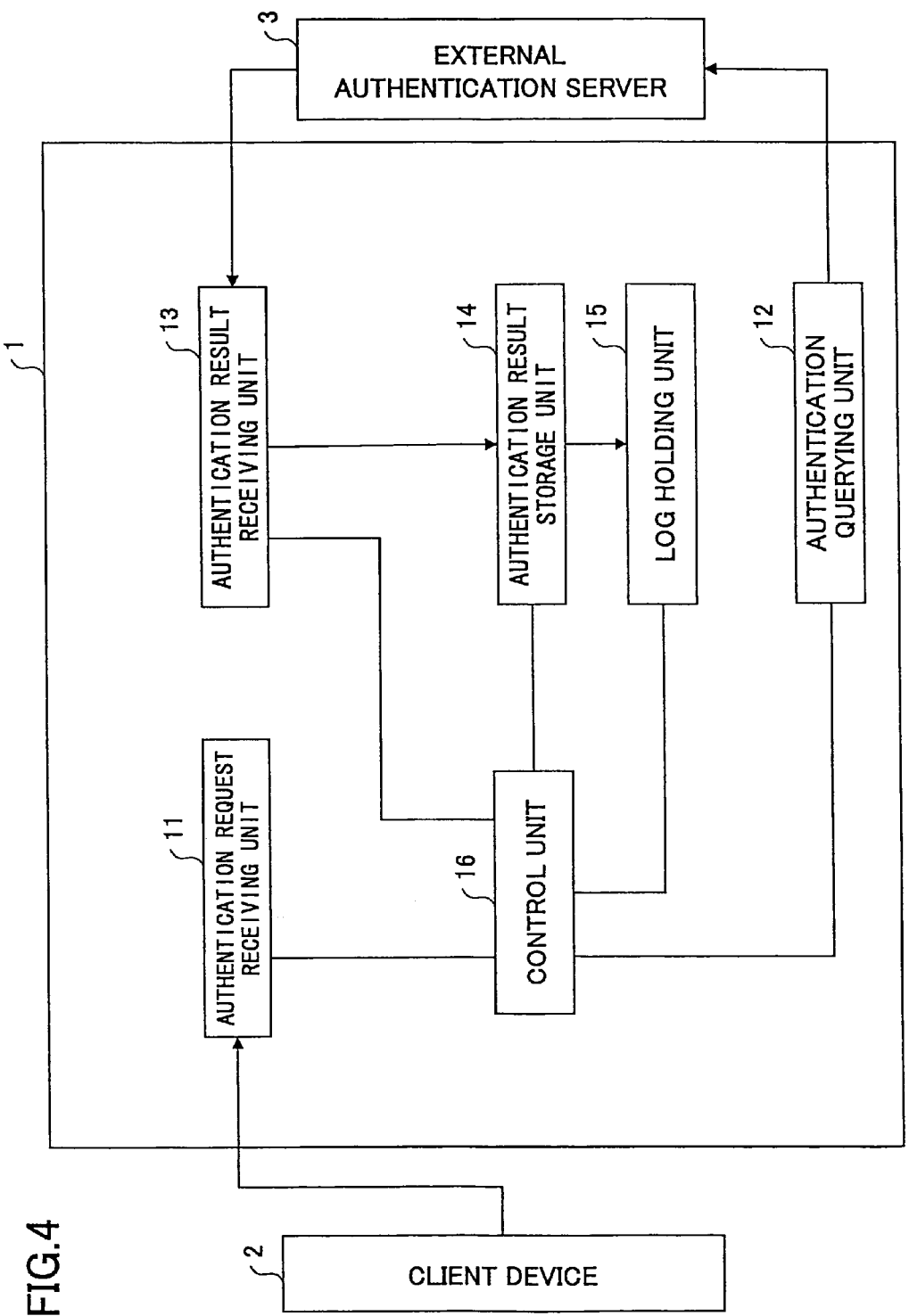
FIG. 4 is a functional block diagram showing an image forming apparatus according to Embodiment 1.
Figure 5:
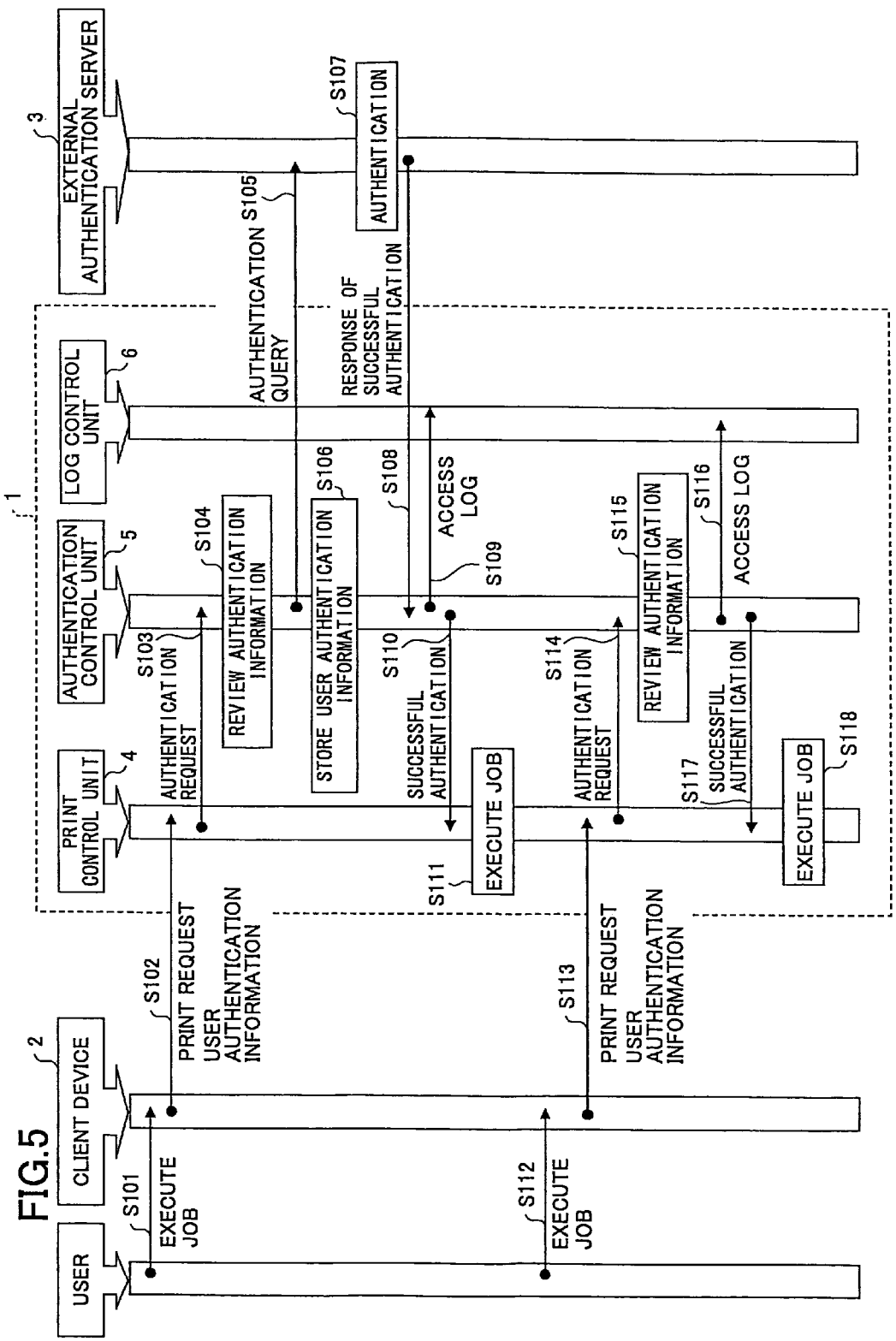
FIG. 5 is an operation sequence diagram illustrating an example of an authentication control method according to Embodiment 1.
Figure 6:
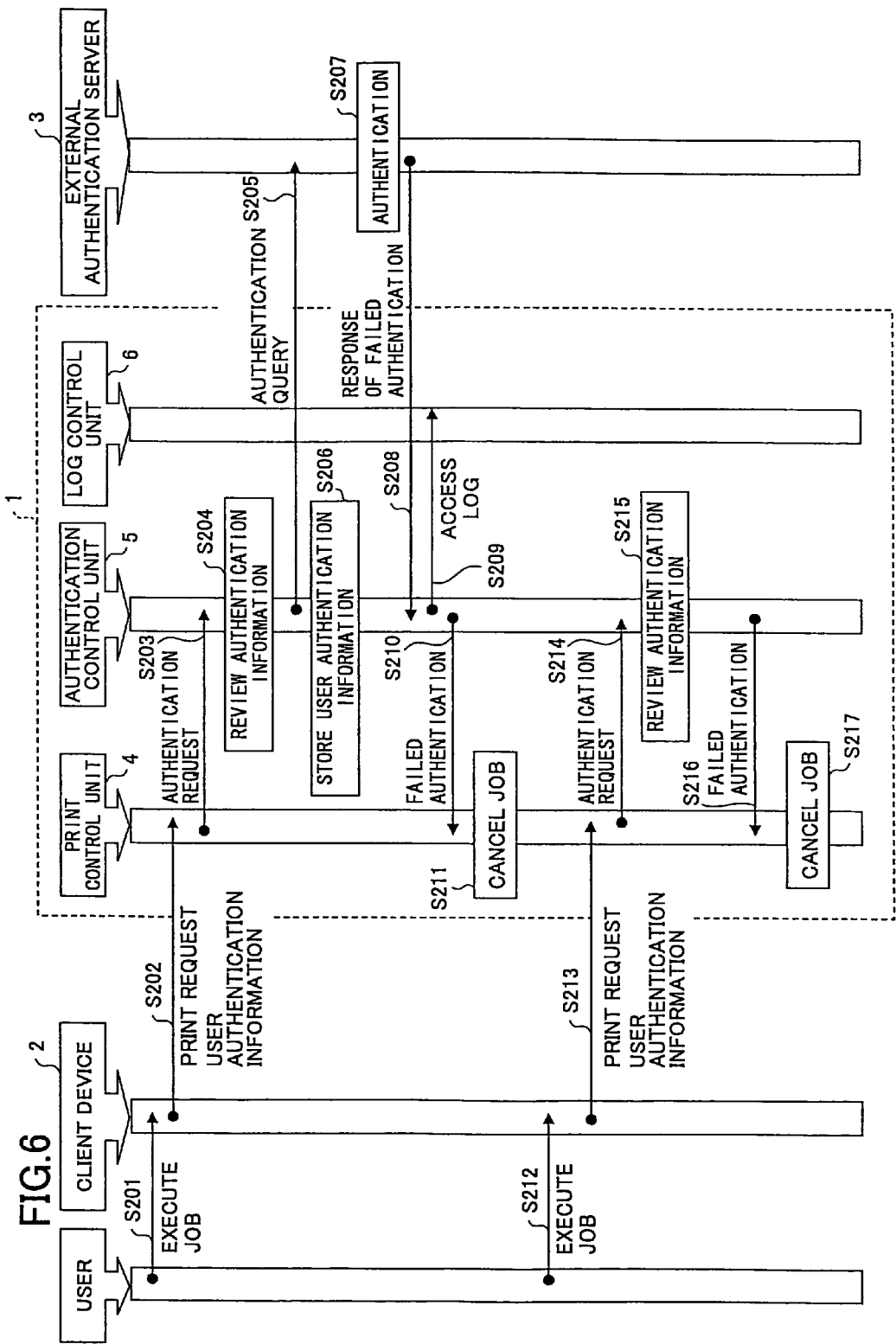
FIG. 6 is an operation sequence diagram illustrating a modified example 1 of an authentication control method according to Embodiment 1.
Figure 7:
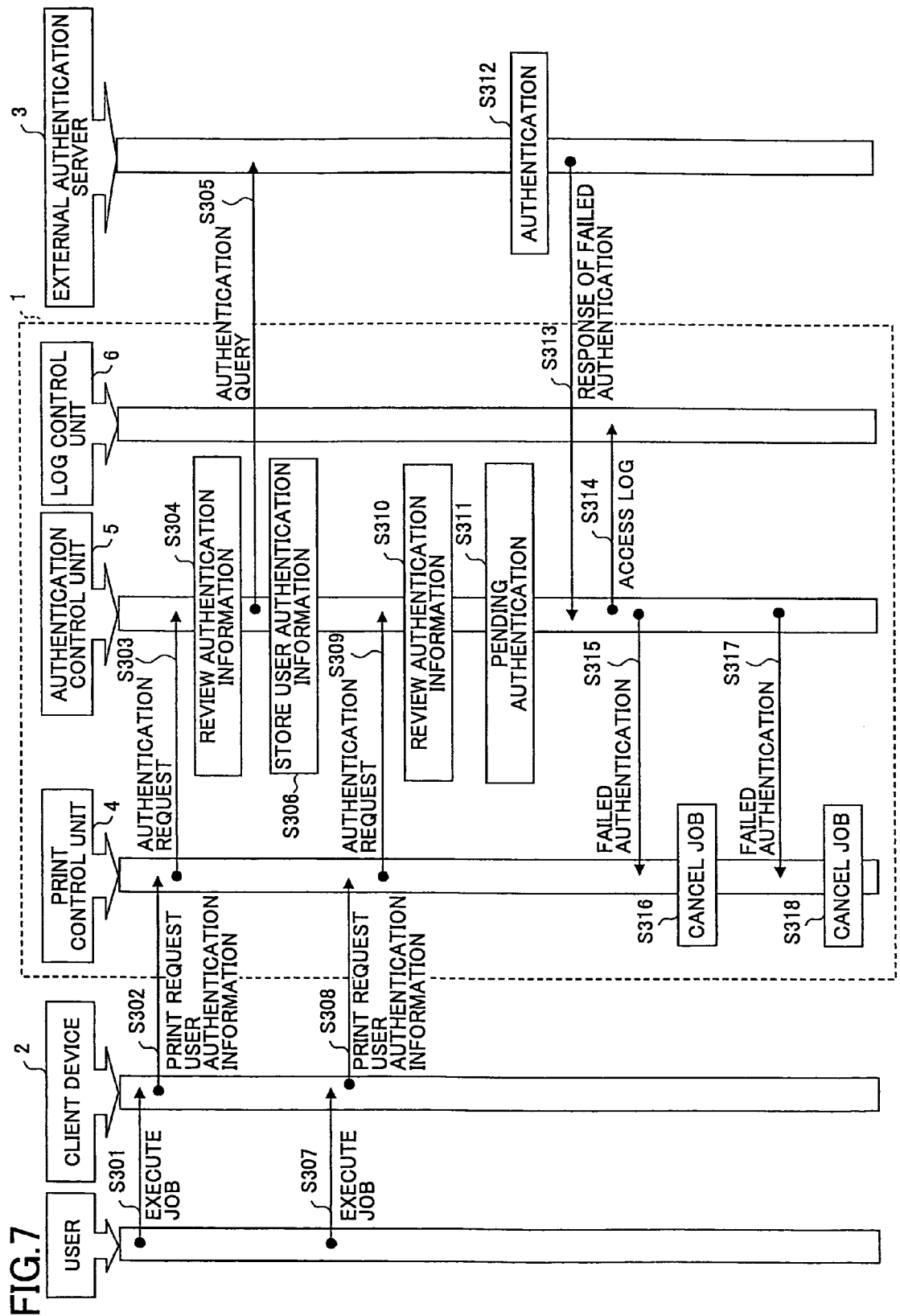
FIG. 7 is an operation sequence diagram illustrating a modified example 2 of an authentication control method according to Embodiment 1.

The following describes an image forming apparatus according to Embodiment 1 of the present invention with reference to FIGS. 4 through 7. FIG. 4 is a functional block diagram showing a printer 1 according to Embodiment 1. FIG. 5 is an operation sequence diagram illustrating an example of an authentication control method according to Embodiment 1. FIGS. 6 and 7 are operation sequence diagrams showing modified examples 1 and 2, respectively, of an authentication control method according to Embodiment 1.

The functional configuration of the printer 1 of Embodiment 1 is described below.

Referring to FIG. 4, the printer 1 includes an authentication request receiving unit 11, an authentication querying unit 12, an authentication result receiving unit 13, an authentication result storage unit 14, a log holding unit 15, and a control unit 16.

The authentication request receiving unit 11 receives an authentication request associated with user authentication information. For instance, the authentication control unit 5 receives an authentication request associated with user authentication information received from the client device 2.

The authentication querying unit 12 queries the external authentication server 3 for authentication based on the user authentication information. This operation is performed by the authentication control unit 5, for example.

The authentication result receiving unit 13 receives an authentication result from the external authentication server 3. For instance, the authentication control unit 5 receives an authentication result indicating "authentication successful" or "authentication failed".

The authentication result storage unit 14 stores the authentication result received by the authentication result receiving unit 13. This operation is performed by the authentication control unit 5, for example. It is to be noted that, in addition to the authentication result, the authentication result storage unit 14 may store the user authentication information to which the authentication result is related.

The log holding unit 15 holds, as an access log, the information stored in the authentication result storage unit 14 including the authentication result and the user authentication information. This operation is performed by the authentication control unit 5, for example.

The control unit 16 controls the authentication request receiving unit 11, the authentication querying unit 12, the authentication result receiving unit 13, the authentication result storage unit 14, and the log holding unit 15.

With this configuration, the printer 1 performs authentication based on the user authentication information received from the client device 2 through communications with the external authentication server 3.

(Example of Authentication Control Method)

An example of an authentication control method performed by the printer 1 is described with reference to FIG. 5 according to an embodiment of the present invention.

In this example, the printer 1 receives two print requests from a PC as the client device 2 (see S102 and S113). The printer 1 performs authentication for the first print request through communications with the external authentication server 3 (see S103-S110) and stores the authentication result therein. Then, the printer 1 performs authentication for the second print request inside the printer 1 by referring to the stored authentication result (see S114-S117). In this example, authentication fails. The following description refers to operations performed by the authentication control unit 5 of FIG. 5 with reference to FIG. 4 as needed.

First, a user instructs the PC as the client device 2 to perform the first print job (S101).

Then, the client device 2 sends a print request and user authentication information to the print control unit 4 (S102).

The print control unit 4 sends an authentication request associated with the received user authentication information to the authentication control unit 5 (S103). In this example, the authentication request receiving unit 11 receives the authentication request.

Then, the authentication control unit 5 reviews the user authentication information (S104).

In step S104, if a corresponding authentication result is stored in the authentication result storage unit 14, the control unit 16 performs authentication for the authentication request received in Step S103 based on the stored authentication result. Since this is the first authentication check, a corresponding authentication result is not stored in the authentication result storage unit 14. Therefore, the control unit 16 does not perform authentication in this step, and the processing proceeds to Step S105.

The authentication control unit 5 queries the external authentication server 3 for authentication (S105).

In this example, the control unit 16 causes the authentication querying unit 12 to query the external authentication server 3 for authentication.

The authentication control unit 5 stores the user authentication information with which the authentication request received by the authentication request receiving unit 11 in step S103 is associated (S106).

In Step S106, the control unit 16 causes the authentication result storage unit 14 to store the user authentication information. In this step, the user authentication information is stored in a manner associated with a query status indicating the status of the authentication query, and an authentication status indicating the authentication result. In this example, the authentication result storage unit 14 stores "processing query" as the query status (see S105) and maintains the authentication status empty.

Then, the external authentication server 3 performs authentication in response to the authentication query (S107).

The external authentication server 3 sends a response of successful authentication as a result of the authentication to the authentication control unit 5 (S108). In this example, the authentication result indicating "authentication successful" is received by the authentication result receiving unit 13. The authentication result storage unit 14 changes the query status from "processing query" to "ready", and changes the authentication status, which has been empty, to "authentication successful".

Then, the authentication control unit 5 outputs an access log to the log control unit 6 (S109). In this example, the control unit 16 causes the log holding unit 15 to hold the authentication result indicating "authentication successful" and the user authentication information that are stored in the authentication result storage unit 14. The control unit 16 then outputs the information held in the log holding unit 15 to the log control unit 6.

Then, the authentication control unit 5 sends the authentication result indicating "authentication successful" to the print control unit 4 (S110).

The print control unit 4 performs a printing operation based on the print request received in Step S102 (S111).

After the printing operation is performed in Step S111, the user instructs the PC as the client device 2 to perform the second print job (S112).

Then, the client device 2 sends a print request and the user authentication information to the print control unit 4 (S113).

The print control unit 4 sends an authentication request associated with the received user authentication information to the authentication control unit 5 (S114). In this example, the authentication request receiving unit 11 receives the authentication request.

Then, the authentication control unit 5 reviews the user authentication information (S115). In this example, the control unit 16 reviews, based on the user authentication information, the query status, and the authentication status stored in the authentication result storage unit 14, the user authentication information with which the authentication request received in step S114 is associated. Since the authentication result indicating "authentication successful" is stored in the authentication result storage unit 14, the authentication is determined to be successful.

Then, the authentication control unit 5 outputs an access log to the log control unit 6 (S116). In this example, the control unit 16 causes the log holding unit 15 to hold the authentication result indicating "authentication successful" and the user authentication information that are stored in the authentication result storage unit 14. The control unit 16 then outputs the information held in the log holding unit 15 to the log control unit 6.

Then, the authentication control unit 5 sends the authentication result indicating "authentication successful" to the print control unit 4 (S117).

The print control unit 4 performs a printing operation based on the print request received in Step S113 (S118).

As described above, the printer 1 of Embodiment 1 receives two print requests from the PC as the client device 2 (see S102 and S113). The printer 1 performs authentication for the first print request through communications with the external authentication server 3 (see S103-S110) and stores the authentication result, and performs authentication for the second print request inside the printer 1 (see S114-S117).

According to this authentication control method, although the printer 1 receives two print requests from the PC as the client device 2, the printer 1 may receive more than two print requests. Authentication for print requests following the second print request are performed in the same manner as the authentication for the second print request.

This method can offer the following advantage. For example, when the printer 1 performs authentication plural times in response to requests from the same user, the printer 1 can perform authentication inside the printer 1 without communicating with the external authentication server 3 the second time and onward. This makes it possible to prevent the external authentication server 3 from being locked up.

(Modified Example 1 of Authentication Control Method)

A modified example 1 of the authentication control method performed by the printer 1 is described with reference to FIG. 6. In the above example of the authentication control method, authentication succeeds. In this example, authentication fails.

In the above example of the authentication control method, two access logs are output in response to two authentication requests (see S109 and S116). In this example, an access log is output in response to a first authentication request (see S209), but no access log is output in response to second and subsequent authentication requests.

More specifically, in the printer 1, if authentication has succeeded, the same number of access logs as the number of executed jobs are output. On the other hand, if authentication has failed, an access log is output only once regardless of the number of executed jobs.

This method can offer the following advantages. For example, if the printer 1 performs fee charging management based on access logs, the printer 1 can hold all the access logs generated upon successful authentication, which contain information required for the fee charging management. Moreover, as the number of access logs generated upon failed authentication, which contain only unnecessary information, held by the printer 1 is minimized, it is possible to reduce workload on the log control unit 6.

(Modified Example 2 of Authentication Control Method)

A modified example 2 of the authentication control method performed by the printer 1 is described with reference to FIG. 7.

In the above example of the authentication control method and the modified example 1, when the printer 1 receives plural print requests from the PC as the client device 2, authentication for the first print request is performed by the external authentication server 3, and a result of the authentication is stored in the printer 1. Then, authentication for the second and subsequent print requests is performed based on the authentication result stored in the printer 1.

This example describes processing performed in the case where the printer 1 receives the second and subsequent print requests before receiving the authentication result for the first print request.

First, a user instructs the PC as the client device 2 to perform a print job (S301).

Then, the client device 2 sends a print request and user authentication information to the print control unit 4 (S302).

The print control unit 4 sends an authentication request associated with the received user authentication information to the authentication control unit 5 (S303). In this example, the authentication request receiving unit 11 receives the authentication request.

Then, the authentication control unit 5 reviews the user authentication information (S304).

In step S304, if a corresponding authentication result is stored in the authentication result storage unit 14, the control unit 16 performs authentication for the authentication request received in Step S303 based on the authentication result. Since this is the first authentication check, a corresponding authentication result is not stored in the authentication result storage unit 14. Therefore, the control unit 16 does not perform authentication in this step, and the processing proceeds to Step S305.

The authentication control unit 5 queries the external authentication server 3 for authentication (S305). In this example, the control unit 16 causes the authentication querying unit 12 to query the external authentication server 3 for authentication.

The authentication control unit 5 stores the user authentication information with which the authentication request received in step S303 is associated (S306). In step S306, the control unit 16 causes the authentication result storage unit 14 to store the user authentication information. In this step, the user authentication information is stored in a manner associated with a query status indicating the status of the authentication query, and an authentication status indicating the authentication result. In this example, the authentication result storage unit 14 stores "processing query" as the query status (see S305) and maintains the authentication status empty.

After that, the user instructs the PC as the client device 2 to perform the second print job (S307).

Then, the client device 2 sends a print request and the user authentication information to the print control unit 4 (S308).

The print control unit 4 sends an authentication request associated with the received user authentication information to the authentication control unit 5 (S309). In this example, the authentication request receiving unit 11 receives the authentication request.

Then, the authentication control unit 5 reviews the user authentication information (S310).

In step S310, the control unit 16 reviews, based on the authentication result stored in the authentication result storage unit 14, the user authentication information with which the authentication request received in step S309 is associated.

In the authentication result storage unit 14, there has been the same user authentication information, having been stored in step S306, as the user authentication information with which the authentication request received in step S309 is associated. Further, in a manner associated with the user authentication information, the query status "processing query" has been stored, and the authentication status has been empty. That is, the external authentication server 3 is currently performing authentication based on the same user authentication information as the user authentication information with which the authentication request received in step S309 is associated. Therefore, the processing proceeds to Step S311 without querying the external authentication server 3 for authentication based on the user authentication information with which the authentication request received in step S309 is associated.

The authentication control unit 5 places the authentication for the authentication request received in step S309 in a pending status (S311).

In Step S311, the control unit 16 causes the authentication result storage unit 14 to store the user authentication information with which the authentication request received in step S309 is associated. Further, in a manner associated with the user authentication information, the authentication result storage unit 14 stores "pending" as the query status and maintains the authentication status empty.

Then, the external authentication server 3 performs authentication in response to the authentication query received in Step S305 (S312).

The external authentication server 3 sends a response of failed authentication as a result of the authentication to the authentication control unit 5 (S313). In this example, the authentication result indicating "authentication failed" is received by the authentication result receiving unit 13. The authentication result storage unit 14 stores the authentication result indicating "authentication failed" received by the authentication result receiving unit 13.

Then, the authentication control unit 5 outputs an access log to the log control unit 6 (S314). In this example, the control unit 16 causes the log holding unit 15 to hold the authentication result indicating "authentication failed" and the user authentication information that are stored in the authentication result storage unit 14. The control unit 16 then outputs the information held in the log holding unit 15 to the log control unit 6.

Then, the authentication control unit 5 sends the authentication result indicating "authentication failed" to the print control unit 4 (S315). The authentication result indicating "authentication failed" sent in this step is for the authentication request received in Step S303.

The print control unit 4 cancels a job based on the authentication result indicating "authentication failed" received in Step S315 (S316). That is, no image forming operation is performed.

Then in Step S317, the authentication control unit 5 sends the authentication result indicating "authentication failed" to the print control unit 4 (S317). The authentication result indicating "authentication failed" sent in this step is for the authentication request received in Step S309.

The print control unit 4 cancels a job based on the authentication result indicating "authentication failed" received in Step S317 (S317). That is, no image forming operation is performed.

As described above, the printer 1 successively receives two print requests from the PC as the client device 2 (see S302 and S308). The printer 1 performs authentication for the first print request through communications with the external authentication server 3. If the printer 1 receives the second print request before receiving an authentication result for the first print request (see S307) and if the second print request is sent from the same user as the user who sent the first print request, the printer 1 places authentication for the second print request in a pending status (see S311). When the printer 1 receives an authentication result for the first print request (see S313), the printer 1 performs the pending authentication for the second print request by referring to the authentication result for the first print request.

In the second modified example 2 of the authentication control method, a single print request is received while performing the authentication for the first print request. However, the second modified example 2 is applicable to other cases. For example, plural print requests may be received while performing the authentication for the first print request. In such a case, processing in Step S317 through S318 is repeated for the same number of times as the number of the print requests following the second print request.

This method is advantageous in continuously performing authentication operations in response to requests from the same user.

Embodiment 2

The following describes an image forming apparatus according to Embodiment 2 of the present invention with reference to FIGS. 8 and 9. FIG. 8 is a functional block diagram showing a printer 1 according to Embodiment 2. FIG. 9 is an operation sequence diagram according to Embodiment 2.

In Embodiment 1, the printer 1 receives plural print requests from the PC as the client device 2. The printer 1 performs authentication for the first print request through communications with the external authentication server 3 and stores the authentication result inside the printer 1. Then, the printer 1 performs authentication for the second print request inside the printer 1 by referring to the stored authentication result.

In Embodiment 2, the authentication result for the first print request is stored for a predetermined period of time in the printer 1, and after the predetermined period of time has passed, the authentication result is deleted. Described below are authentication operations for a print request received during the predetermined period of time and for a print request received after the predetermined period of time has elapsed.

If the authentication result is "authentication failed", the printer 1 reports the authentication failure to the client device 2. The client device 2 reports the authentication failure to the user by displaying it on the screen.

Referring to FIG. 8, the printer 1 includes an authentication request receiving unit 11, an authentication querying unit 12, an authentication result receiving unit 13, an authentication result storage unit 14, a log holding unit 15, a control unit 16, a storage time setting unit 17, and an authentication result reporting unit 18.

The authentication request receiving unit 11, the authentication querying unit 12, the authentication result receiving unit 13, and the log holding unit 15 are the same as those of Embodiment 1 and are not described herein.

The authentication result storage unit 14 stores an authentication result received by the authentication result receiving unit 13. The authentication result is held by the authentication result storage unit 14 during a period of time specified by the storage time setting unit 17. When the period of time specified by the storage time setting unit 17 has elapsed, stored information is deleted. This operation is performed by the authentication control unit 5, for example. It is to be noted that, in addition to the authentication result, the authentication result storage unit 14 may store the user authentication information to which the authentication result is related.

The control unit 16 controls the authentication request receiving unit 11, the authentication querying unit 12, the authentication result receiving unit 13, the authentication result storage unit 14, the log holding unit 15, the storage time setting unit 17, and the authentication result reporting unit 18.

The authentication result reporting unit 18 reports an authentication result to the client device 2. For example, the authentication result reporting unit 18 reports to the client device 2 an authentication result stored in the authentication result storage unit 14 or a result of authentication performed by the control unit 16.

With this configuration, the printer 1 performs authentication inside the printer 1 based on the user authentication information received from the client device 2.

(Example of Authentication Control Method)

An example of an authentication control method performed by the printer 1 is described with reference to FIG. 9 according to Embodiment 2.

The printer 1 receives three print requests from a PC as the client device 2 (see S402, S415, and S423). The printer 1 performs authentication for the first print request through communications with the external authentication server 3 (see S403-S410) and holds the authentication result inside the printer 1 for a predetermined period of time, 15 minutes in this example (see S413-S421). The printer 1 performs authentication for the second and third print requests as described below. In this example, authentication fails. The following description refers to operations performed by the authentication control unit 5 of FIG. 9 with reference to FIG. 8 as needed.

Processing in Steps S401 through S411 is similar to the processing in Steps S201 through S211 of the modified example 1 of the authentication control method of Embodiment 1 and is not described herein.

In Step S412, the authentication control unit 5 sends a failed authentication report to the client device 2 (S412). In this example, the control unit 16 causes the authentication result reporting unit 18 to report to the client device 2 the authentication result indicating "authentication failed" for an authentication request received in Step S403. Based on the received failed authentication report, the client device 2 displays the user authentication information, print job information, etc., to which the authentication result indicating "authentication failed" is related, on the screen.

Then in Step S413, the authentication control unit 5 stores the information related to the authentication result indicating "authentication failed" (S413). In this example, the authentication result storage unit 14 stores the user authentication information to which the authentication result indicating "authentication failed" is related. The authentication result storage unit 14 changes the query status for this user authentication information to "ready" and the authentication status to "authentication failed", and holds these pieces of information for the predetermined period of time, 15 minutes in this example, specified by the storage time setting unit 17 (until below-described Step S421).

After a job is cancelled in Step S411, the user instructs the PC as the client device 2 to perform the second print job (S414).

Then, the client device 2 sends a print request and the user authentication information to the print control unit 4 (S415).

The print control unit 4 sends an authentication request associated with the received user authentication information to the authentication control unit 5 (S416). In this example, the authentication request receiving unit 11 receives the authentication request.

Then, the authentication control unit 5 reviews the user authentication information (S417). In this example, the control unit 16 performs, based on the user authentication information, the query status, and the authentication status stored in the authentication result storage unit 14, authentication for the authentication request received in step S416. In Step S417, since the authentication result indicating "authentication failed" is stored in the authentication result storage unit 14, the authentication is determined to have failed.

Then, the authentication control unit 5 sends the authentication result indicating "authentication failed" to the print control unit 4 (S418).

The print control unit 4 cancels a job based on the authentication result indicating "authentication failed" received in Step S418 (S419). That is, no image forming operation is performed.

The authentication control unit 5 sends a failed authentication report to the client device 2 (S420). In this example, the control unit 16 causes the authentication result reporting unit 18 to report to the client device 2 the authentication result indicating "authentication failed" for the authentication request received in Step S416. Based on the received failed authentication report, the client device 2 displays the user authentication information, print job information, etc., to which the authentication result indicating "authentication failed" is related, on the screen.

When 15 minutes have elapsed since execution of the operation of storing the user authentication information in Step S413, the stored information is deleted (S421).

In Step S422, the user instructs the PC as the client device 2 to perform the third print job (S422).

Processing in Steps S423 through S426 is similar to the processing in Steps S402 through S405 and is not described herein.

As described above, the printer 1 receives three print requests from a PC as the client device 2 (see S402, S415, and S423). The printer 1 performs authentication for the first print request through communications with the external authentication server 3 (see S403-S410) and holds the authentication result inside the printer 1 for a predetermined period of time, 15 minutes in this example (see S413-S421).

The authentication for the second print request is performed inside the printer 1 by referring to the stored authentication result (S416-S418) because the authentication result for the first print request is held in the printer 1.

On the other hand, the authentication for the third print request is performed through communications with the external authentication server 3 as in the case of the first print request because the authentication result for the first print request has been deleted from the printer 1.

In addition to the advantage of Embodiment 1, this method is advantageous in performing re-authentication after a predetermined period of elapsed time.

Moreover, with the processing in Step S412 and S420, it is possible to report to the user that authentication has failed via the PC as the client device 2.

In the printer 1 of Embodiment 2, the storage time setting unit 17 specifies the period of time during which the authentication result is held by the authentication result storage unit 14. Further, the authentication result reporting unit 18 reports the authentication result to the client device 2. Similar operations may be performed in the printer 1 of Embodiment 1.

Although the present invention is described with reference to the preferred embodiments, the present invention is not limited to these specific embodiments and may include any combination of features disclosed herein. Variations and modifications may be made without departing from the scope of the present invention.

The present application is based on Japanese Priority Application No. 2006-206522 filed on Jul. 28, 2006, with the Japanese Patent Office, the entire contents of which are hereby incorporated by reference.

What is claimed is:

1. An authentication control device connected to an external authentication device which performs authentication to allow a user to use the authentication control device, comprising:
    an authentication information receiving unit configured to receive user authentication information;
    a querying unit configured to query the external authentication device for authentication in response to receiving the user authentication information;
    a receiving unit configured to receive a related information of a result of the authentication performed by the external authentication device;
    a storing unit configured to store the related information;
    a determining unit configured to determine whether to perform authentication based on the related information in the storing unit or query the external authentication device for authentication when the authentication information receiving unit receives the user authentication information; and
    an authentication control unit configured to perform authentication based on the related information in the storing unit when the determining unit determines to perform authentication based on the related information, wherein, the authentication control unit is configured such that if the user authentication information currently received by the authentication information receiving unit is the same as previously received user authentication information and if the receiving unit has not received related information based on the previously received user authentication information, based on the currently received user authentication information, the authentication control unit sets an authentication status of the authentication control device to be a pending status.

2. The authentication control device as claimed in claim 1, wherein, the authentication control unit is configured such that if the determining unit determines not to perform authentication based on the related information, the authentication control unit causes the authentication querying unit to query the external authentication device for authentication based on the user authentication information.

3. The authentication control device as claimed in claim 1, further comprising:
    a valid term setting unit configured to specify a term during which the related information is valid.

4. The authentication control device as claimed in claim 1, further comprising:
    a clearing unit configured to clear the related information.

5. The authentication control device as claimed in claim 1, wherein, the authentication control unit is configured such that if the user authentication information currently received by the authentication information receiving unit is the same as the previously received user authentication information and if the receiving unit has not received the related information based on the previously received user authentication information, based on the currently received user authentication information, the authentication control unit places authentication in a pending status.

6. The authentication control device as claimed in claim 1, further comprising:
    a reporting unit configured to report to a source of the user authentication information the result of the authentication.

7. The authentication control device as claimed in claim 1, further comprising:
    a log holding unit configured to hold the result of the authentication as a log.

8. The authentication control device as claimed in claim 7, wherein, the authentication control unit is configured such that if the authentication is successful, the authentication control unit causes the log holding unit to hold the result of the authentication.

9. The authentication control device as claimed in claim 1, wherein the user authentication information includes at least a user ID.

10. The authentication control device as claimed in claim 1, wherein the related information has a valid term, the valid term being a term during which the related information is valid.

11. The authentication control device as claimed in claim 1, wherein the authentication information receiving unit is configured to receive the user authentication information from an external client device.

12. The authentication control device as claimed in claim 1, wherein the authentication control device is configured to perform image formation based on an image formation request.

13. The authentication control device as claimed in claim 1, wherein the authentication control device is configured such that a subsequent authentication is performed through communication with the external authentication device.

14. A non-transitory computer readable medium storing instructions that, when executed, cause a computer to implement an authentication control device capable of being connected to an external authentication device which performs authentication to allow a user to use the authentication control device, the authentication control device comprising:
   an authentication information receiving unit configured to receive user authentication information;
   a querying unit configured to query the external authentication device for authentication in response to receiving the user authentication information;
   a receiving unit configured to receive a related information of a result of the authentication performed by the external authentication device;
   a storing unit configured to store the related information;
   a determining unit configured to determine whether to perform authentication based on the related information in the storing unit or query the external authentication device for authentication when the authentication information receiving unit receives the user authentication information; and
   an authentication control unit configured to perform authentication based on the related information in the storing unit when the determining unit determines to perform authentication based on the related information, wherein, the authentication control unit is configured such that if the user authentication information currently received by the authentication information receiving unit is the same as previously received user authentication information and if the receiving unit has not received related information based on the previously received user authentication information, based on the currently received user authentication information, the authentication control unit sets an authentication status of the authentication control device to be a pending status.

* * * * *